(12) United States Patent
Hu

(10) Patent No.: US 12,517,670 B2
(45) Date of Patent: Jan. 6, 2026

(54) METHODS FOR CONTROLLING MEMORY BLOCKS IN MEMORY DEVICES

(71) Applicant: YANGTZE MEMORY TECHNOLOGIES CO., LTD., Hubei (CN)

(72) Inventor: Haiyang Hu, Hubei (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 134 days.

(21) Appl. No.: 18/056,355

(22) Filed: Nov. 17, 2022

(65) Prior Publication Data

US 2024/0168668 A1    May 23, 2024

(51) Int. Cl.
*G06F 3/00* (2006.01)
*G06F 3/06* (2006.01)
*G06F 12/00* (2006.01)

(52) U.S. Cl.
CPC ............ *G06F 3/064* (2013.01); *G06F 3/0604* (2013.01); *G06F 3/0653* (2013.01); *G06F 3/0673* (2013.01)

(58) Field of Classification Search
CPC ...... G06F 3/064; G06F 3/0604; G06F 3/0653; G06F 3/0673
USPC ........................................................ 711/154
See application file for complete search history.

(56) References Cited

U.S. PATENT DOCUMENTS

| | | | |
|---|---|---|---|
| 9,417,809 B1 * | 8/2016 | Camp .................. | G06F 11/108 |
| 9,582,199 B2 * | 2/2017 | Ranjith Reddy ....... | G06F 3/064 |
| 9,959,060 B1 * | 5/2018 | Tang ...................... | G06F 3/0679 |
| 10,642,505 B1 * | 5/2020 | Kuzmin ................ | G06F 3/0679 |
| 11,249,652 B1 * | 2/2022 | Kuzmin .................. | G06F 3/061 |
| 11,550,727 B2 * | 1/2023 | Bhardwaj ............ | G06F 12/0246 |
| 11,646,065 B2 * | 5/2023 | Porter ................. | G11C 13/0035 |
| | | | 711/103 |
| 11,868,267 B2 * | 1/2024 | McGlaughlin .......... | G06F 3/064 |
| 2011/0264859 A1 * | 10/2011 | Yano .................... | G06F 12/0246 |
| | | | 711/E12.02 |
| 2012/0124294 A1 * | 5/2012 | Atkisson ............. | G06F 12/0804 |
| | | | 711/135 |
| 2012/0198174 A1 * | 8/2012 | Nellans .................. | G06F 3/065 |
| | | | 711/E12.009 |
| 2012/0284587 A1 * | 11/2012 | Yu ....................... | G06F 12/0868 |
| | | | 711/E12.008 |

(Continued)

*Primary Examiner* — Sheng Jen Tsai

(74) *Attorney, Agent, or Firm* — HANLEY, FLIGHT & ZIMMERMAN, LLC

(57) ABSTRACT

The present disclosure describes a method of controlling memory blocks. The method comprises determining a first write version number of a first group of address units (AUs) of a plurality of AUs, wherein each AU of the first group of AUs comprises at least one logical block address (LBA) of a plurality of memory blocks and determining a second write version number of the first group of AUs. The method comprises calculating a difference between the first and second write version numbers and determining a third write version number of a second group of AUs of the plurality of AUs. The method further comprises determining a dynamic attribute of the first group of AUs using the first write version number, the difference, and the third write version number, determining an activeness status of the first group of AUs using the dynamic attribute, and moving data based on the activeness status.

19 Claims, 4 Drawing Sheets

(56) References Cited

U.S. PATENT DOCUMENTS

| | | | |
|---|---|---|---|
| 2015/0106556 A1* | 4/2015 | Yu | G06F 12/0246 |
| | | | 711/103 |
| 2017/0160960 A1* | 6/2017 | Camp | G06F 3/0689 |
| 2017/0285948 A1* | 10/2017 | Thomas | G06F 3/0616 |
| 2018/0165189 A1* | 6/2018 | Tai | G06F 3/064 |
| 2018/0190329 A1* | 7/2018 | Kathawala | G06F 12/0246 |
| 2018/0357160 A1* | 12/2018 | Gorobets | G06F 3/064 |
| 2021/0365202 A1* | 11/2021 | Shin | G06F 3/0679 |
| 2023/0126807 A1* | 4/2023 | Kim | G06F 12/145 |
| | | | 711/163 |
| 2023/0127449 A1* | 4/2023 | Kim | G06F 3/0604 |
| | | | 711/154 |
| 2023/0127606 A1* | 4/2023 | Nam | G06F 12/109 |
| | | | 711/103 |
| 2023/0130233 A1* | 4/2023 | Nam | G06F 12/121 |
| | | | 711/154 |
| 2023/0135020 A1* | 5/2023 | Byun | G06F 3/0659 |
| | | | 711/154 |
| 2024/0143187 A1* | 5/2024 | Jin | G06F 3/0683 |

\* cited by examiner

| Seg 6 | Seg 0 | Seg 0 | Seg 0 | Seg 0 |
|---|---|---|---|---|
| Seg 0 | Seg 11 | Seg 0 | Seg 15 | Seg 0 |
| Seg 1 | Seg 1 | Seg 0 | Seg 19 | Seg 1 |
| Seg 0 | Seg 2 | Seg 1 | Seg 9 | Seg 1 |
| Seg 0 | Seg 0 | Seg 7 | Seg 0 | Seg 0 |
| Seg 3 | Seg 0 | Seg 10 | Seg 0 | Seg 0 |
| Seg 0 | Seg 0 | Seg 0 | Seg 1 | Seg 8 |
| Seg 0 | Seg 0 | Seg 1 | Seg 14 | Seg 2 |
| Seg 12 | Seg 0 | Seg 13 | Seg 1 | Seg 1 |
| Seg 2 | Seg 0 | Seg 2 | Seg 0 | Seg 0 |

FIG. 2

METHODS FOR CONTROLLING MEMORY BLOCKS IN MEMORY DEVICES

TECHNICAL FIELD

The present disclosure generally relates to methods for controlling memory blocks in memory devices.

BACKGROUND

With advances in semiconductor technology, there has been increasing demand for higher storage capacity, faster processing systems, higher performance, and lower costs. To meet these demands, the semiconductor industry continues to scale down the dimensions of semiconductor devices.

The present disclosure relates to memory devices and operation methods thereof. A flash memory device is a low-cost, high-density, non-volatile solid-state storage medium that can be electrically erased and reprogrammed. Flash memory devices can include NOR flash memory devices and NAND flash memory devices. Various operations can be performed by a flash memory device, such as read, program (write), and erase, to change the threshold voltage of each memory cell to a nominal level. For a NAND flash memory device, an erase operation can be performed at the block level, and a program operation or a read operation can be performed at the page level.

BRIEF SUMMARY

Embodiments of methods for simulating power circuits and systems for performing the same are described in the present disclosure.

Some embodiments of this disclosure relate to a method of controlling memory blocks. The method comprises determining a first write version number of a first group of address units (AUs) of a plurality of AUs, wherein each AU of the first group of AUs comprises at least one logical block address (LBA) of a plurality of memory blocks, determining a second write version number of the first group of AUs, calculating a difference between the first and second write version numbers, and determining a third write version number of a second group of AUs of the plurality of AUs. The method further comprises determining a dynamic attribute of the first group of AUs using the first write version number, the difference, and the third write version number, determining an activeness status of the first group of AUs using the dynamic attribute, determining erase counts of a plurality of data units, and determining a first data unit having a higher erase count. The method further comprises determining a second data unit having a lower erase count and moving data stored in the first group of AUs into the first or second data unit of the plurality of data units based on the activeness status.

Some embodiments of this disclosure relate to an electronic system comprising a storage medium comprising a plurality of flash memory arrays, a host computer, and a host controller. Each flash memory array of the plurality of flash memory arrays comprises a plurality of data units. The host controller is configured to determine a first write version number of a first group of address units (AUs) of a plurality of AUs, wherein each AU of the first group of AUs comprises at least one logical block address (LBA) of a plurality of memory blocks, determine a second write version number of the first group of AUs, calculate a difference between the first and second write version numbers, and determine a third write version number of a second group of AUs of the plurality of AUs. The host controller is further configured to determine a dynamic attribute of the first group of AUs using the first write version number, the difference, and the third write version number, determine an activeness status of the first group of AUs using the dynamic attribute, determine erase counts of a plurality of data units, and determine a first data unit having a higher erase count. The host controller is further configured to determine a second data unit having a lower erase count and move data stored in the first group of AUs into the first or second data unit of the plurality of data units based on the activeness status Some embodiments of this disclosure relate to a non-transitory computer-readable medium containing computer-executable program for, when being executed by a processor, implementing a method for controlling memory blocks. The method comprises determining a first write version number of a first group of address units (AUs) of a plurality of AUs, wherein each AU of the first group of AUs comprises at least one logical block address (LBA) of a plurality of memory blocks, determining a second write version number of the first group of AUs, calculating a difference between the first and second write version numbers, and determining a third write version number of a second group of AUs of the plurality of AUs. The method further comprises determining a dynamic attribute of the first group of AUs using the first write version number, the difference, and the third write version number, determining an activeness status of the first group of AUs using the dynamic attribute, determining erase counts of a plurality of data units, and determining a first data unit having a higher erase count. The method further comprises determining a second data unit having a lower erase count and moving data stored in the first group of AUs into the first or second data unit of the plurality of data units based on the activeness status.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 2 is a schematic diagram of a mapping table of a memory device, in accordance with some embodiments.

Figure 1:
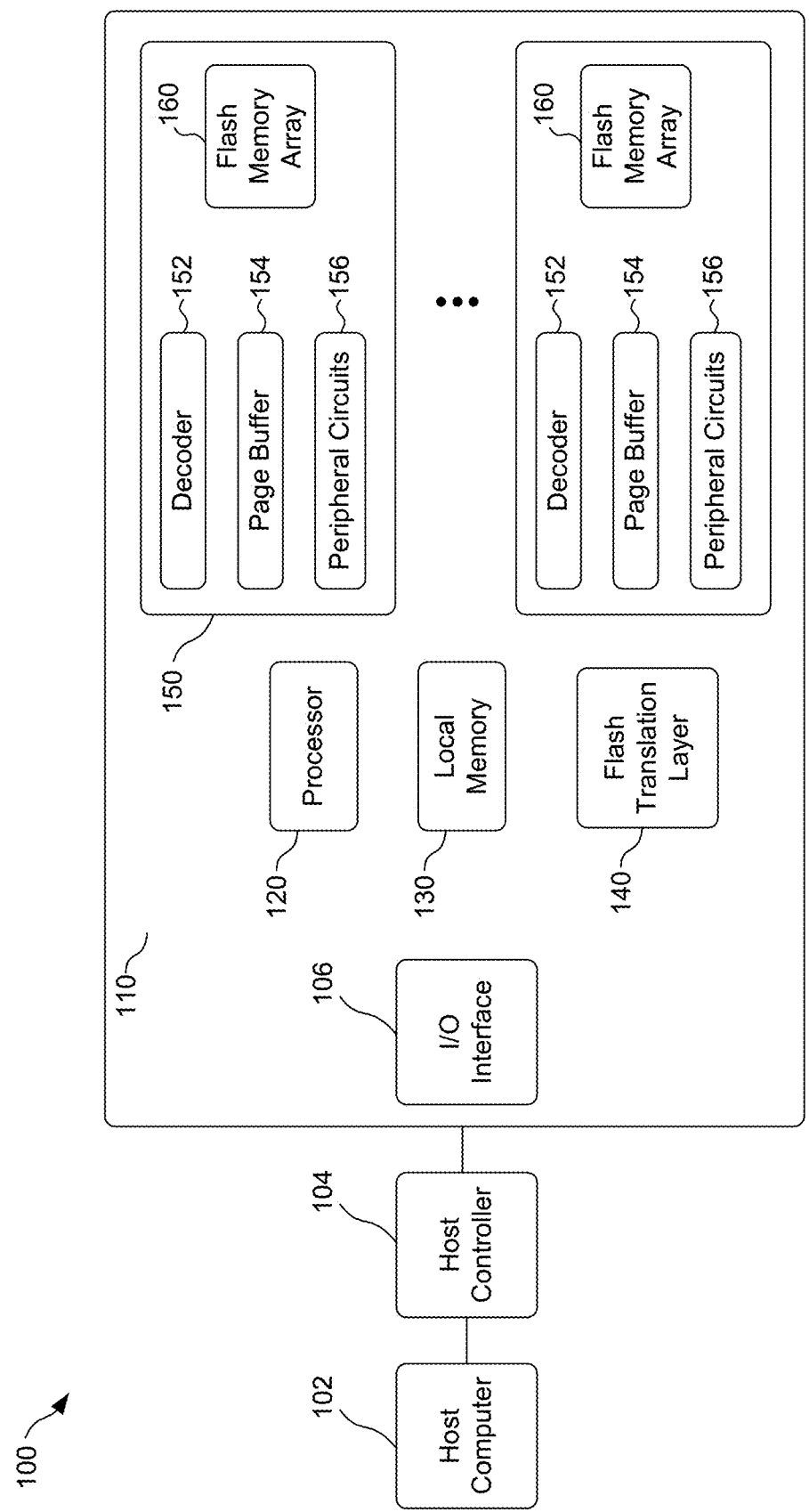
FIG. 1 illustrates a block diagram of an exemplary flash memory system, in accordance with some embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

For non-volatile memory devices, repeatedly performing erase and write operations on blocks of data can gradually cause wear on memory cells. Over time, the memory cells may lose the ability to be programmed or retain a charge representing the stored data, which in turn may lead to bit errors that can render portions of the memory device unusable. To improve memory cell wear levelling and storage efficiency, data stored in non-volatile memory devices can be labelled with an activeness status, such as hot data or cold data. Generally, hot data can be a type of data that is expected to be relatively frequently updated and used. Compared to hot data, cold data can be a type of data that is relatively infrequently updated or used. For example, under the static wear-levelling model, which may consider blocks across an entire flash memory chip, a piece of data is determined to be cold data if its version number is smaller than a threshold value. However, as cold data may also be updated periodically, using only the static version number for labelling data may lead to deteriorating wear levelling performance, lower total bytes written (TBW), and undesirable write amplification (WA) of the non-volatile memory device. Therefore, there is a need to efficiently identify hot data and cold data for distributing write operations efficiently among memory blocks of non-volatile memory devices. Efficiently and uniformly operating a non-volatile memory can extend its lifetime by evening out the number of erase/write cycles across all memory blocks of the non-volatile memory device.

Various embodiments in the present disclosure describe methods for controlling writing and erasing memory blocks by dynamically labelling and arranging data stored in the memory blocks, according to some embodiments of the present disclosure. In some embodiments, data stored in super blocks (e.g., a set of adjacent physical blocks) can be assigned one or more dynamic attributes (e.g., version numbers) that is determined based on at least a latest global latest write version number and a history write version gap. In some embodiments, multiple address units (AUs) can be grouped together and assigned a single dynamic attribute. In some embodiments, AUs can also be referred to as allocation units. The history write version gap can be a gap between the current version number of the effective AU and a previous version number of the AU when it was last updated. Benefits of assigning dynamic attributes can include, but are not limited to, a more accurate determination of hot or cold data and improved wear leveling for memory devices. For example, cold data (e.g., data that is unlikely to be updated over a predetermined amount of time) can be identified and moved to super blocks with higher counts (e.g., write, read, and/or erase counts) to balance the wear levels across the memory device.

FIG. 1 illustrates a block diagram of an electronic system 100, in accordance to some embodiments. The electronic system 100 may include, but is not limited to, a mobile phone, a desktop computer, a laptop computer, a tablet, a vehicle computer, a gaming console, a printer, a positioning device, a wearable electronic device, a smart sensor, a virtual reality (VR) device, an augmented reality (AR) device, Internet of Things (IoT) devices, or any other suitable electronic devices having storage therein. The electronic system 100 can include a host computer 102, a host controller 104, and a storage system 110. In some embodiments, storage system 110 can be referred to as a storage medium, a NAND storage system or a solid state drive (SSD). Storage system 110 can include an I/O interface 106, a processor 120, a local memory 130, a flash translation layer 140, and an array of flash memory chips 150 (e.g., an array of NAND flash memory devices). Flash memory chips 150 can include decoder 152, page buffer 154, peripheral circuits 156, and flash memory array 160. Storage system 110 and flash memory chips 150 can include additional circuitry or devices that are not described herein for simplicity.

Storage system 110 communicates with a host controller 104 through an I/O interface 106. Host controller 104 is operable to request storage system 110 to perform read, program, and erase operations of flash memory chips 150 by sending commands and/or data through I/O interface 106. Processor 120 can be configured to retrieve data from one or more flash memory chips 150 and send the data to host controller 104 via I/O interface 106. Host controller 104 can transmit the data to host computer 102 or other system components not illustrated in FIG. 1.

Host computer 102 can include suitable processor chipset and software executed by the processor chipset. The processor chipset can include cores, caches, storage protocol controllers (e.g., a PCIe controller or a SATA controller), and any suitable circuitry. Host computer 102 sends data to be stored at storage system 110 or retrieves data by reading storage system 110.

Host controller 104 sends data to be stored at storage system 110 or retrieves data by instructing processor 120 to read data from flash memory chips 150. Host controller 104 can handle I/O requests received from host computer 102, ensure data integrity and efficient storage, and manage storage system 110.

Interface 106 can include suitable data bus for providing data and control communication between storage system 110 and host controller 104. In some embodiments, I/O interface 106 can include a serial advanced technology attachment (SATA) interface, a peripheral component interconnect express (PCIe) interface, a universal serial bus (USB) interface, a non-volatile memory express (NVMe) interface, or any suitable interfaces.

Storage system 110 can include processor 120, local memory 130, flash translation layer 140, and flash memory chips 150. Other suitable components can be included in storage system 110 and are not illustrated in FIG. 1 or described herein for simplicity.

Processor 120 can be any suitable integrated circuitry configured to receive instructions from host controller 104 and perform read, program, erase operations—as well understood by persons of ordinary skill in the art—of flash memory chips 150 by transmitting commands and/or data with flash memory chips 150. For example, processor 120 can receive requests for flash media access, such as read or write operations, from external devices or host computer 102 through host controller 104. Processor 120 can be further configured to communicate with and control other components of storage system 110. For example, processor 120 can scan local memory 130 for address-mapping information and send the address-mapping information to flash translation layer 140. Processor 120 can further communicate with components of flash memory chips 150, such as decoder 152, page buffer 154, peripheral circuits 156, flash memory array 160, and other suitable components.

Local memory 130 can be used to store commands for the operation of processor 120. In some embodiments, local memory 130 can be a storage media for storing logical-to-physical (L2P) mapping information. For example, local memory 130 can include single-level direct L2P mapping tables for a sector of flash memory chips 150. In some embodiments, local memory 130 can include page global directory information for flash memory chips 150. The page global directory information can be stored in a random access memory device (RAM) and used as a pseudo-cache to provide fast lookup of mapping data. In some embodiments, local memory 130 can be a static random access memory (SRAM) storage device. Page global directories are well understood by persons of ordinary skill in the art and are not described in detail herein for simplicity. In some embodiments, local memory 130 can include software codes, commands, computer logic, firmware, any suitable information. Local memory 130 can also include non-transitory computer-readable medium that contains computer-executable program for, when being executed by a processor, implementing a method for controlling memory devices formed in flash memory array 160.

Flash translation layer (FTL) 140 can be a device-based FTL and configured to provide L2P mapping tables for converting between logical addresses and physical addresses. Requests for accessing flash media received by processor 120 can include one or more logical block address where user data should be read or written. Flash translation layer 140 can be configured to translate the logical block address of the desired data into a physical address by scanning through various L2P tables. For example, flash translation layer 140 can generate L2P mapping information and send such information to storage media located in storage system 110, such as local memory 130. Flash translation layer 140 can also send the mapping information to storage media located on flash memory chips 150, such as on-die SRAM or memory cells. Flash translation layer 140 can also search abovementioned storage media for L2P information upon requests by processor 120. In some embodiments, flash translation layer 140 can be configured to receive instructions from host controller 104 and perform any suitable tasks, such as garbage collection, wear leveling, read disturb control, data retention control, bad block management, etc.

Decoder 152 can include row decoders and column decoders. In some embodiments, decoder 152 can also include bit line drivers and word line drivers. Column decoders or bit line drivers can be configured to select one or more NAND memory strings of flash memory array 160 by applying bit line voltages generated from one or more voltage generators. Row decoders or word line drivers can be configured to drive word lines using word line voltages generated from the voltage generators.

Page buffer 154 can be configured to read and write data from and to flash memory array 160 according to the control signals from processor 120. In some embodiments, page buffer 154 can include other suitable circuitry, such as one or more sense amplifier circuitry. Page buffer 154 can store one page of write data to be programmed into one page of flash memory array 160. In some embodiments, page buffer 154 can perform program verify operations to ensure that the data has been properly programmed into flash memory array 160.

Peripheral circuits 156 can be formed in areas surrounding flash memory array 160. Periphery circuits 156 can contain many digital, analog, and/or mixed-signal circuits to support functions of flash memory array 160, for example, active and/or passive semiconductor devices, such as transistors, diodes, capacitors, resistors, etc., as would be apparent to a person of ordinary skill in the art.

Flash memory array 160 can be configured to store user data and include circuitry components for communicating with other components of storage system 110. In some embodiments, each flash memory chip 150 can include data cache and three-dimensional NAND flash memory cells. Three-dimensional NAND flash memory cells can be formed from vertically oriented strings of memory cell transistors (referred to herein as "memory strings," such as NAND memory strings) extending through a stack of alternating conductive and dielectric layers. The three-dimensional NAND flash memory cells can include staircase structures formed on one or more sides (edges) of the stacked storage structure.

FIG. 2 is a schematic diagram of a mapping table of a memory device, according to some embodiments. Mapping table 200 illustrated in FIG. 2 can be a mapping table for a solid-state drive (SSD) and used to map multiple logical block addresses (LBAs) of a host to multiple physical addresses of a NAND flash memory device. In general, mapping table 200 can be a one-level mapping table and may need a sizable dynamic random-access memory (DRAM) buffer to store mapping entries of the logical index.

When an SSD firmware of the SSD is powered on, mapping table 200 can be restored from the NAND flash to a DRAM buffer for the mapping of a next coming address. To reduce restoring time, a management module of the SSD can be configured to divide mapping table 200 into multiple segments and generate multiple count values corresponding to the multiple segments. In some embodiments, mapping table 200 includes predetermined numbers of rows and columns, and the total number of the rows and columns is determined by the total number of memory blocks to be programmed. Each segment of mapping table 200 can map one or more LBAs to one or more corresponding physical address of memory blocks on the flash memory device. Mapping table 200 can contain references or pointers to data that is physically stored in the flash memory device. When mapping table 200 is updated based on a write command, the corresponding segment can point to actual data stored in the flash memory device. As an example, mapping table 200 can be divided into 20 segments, denoted as Seg 0~Seg 19. When one of the LBAs is updated by the host, one of the segments corresponding to the updated LBA would increase by 1. Subsequently, if the one of the multiple count values reaches a threshold, the SSD firmware would trigger a flush operation to write one of the multiple segments corresponding to the one of the LBAs into the NAND flash. An exemplary flush segment distribution in a NAND flash device can be developed based on the JESD219 standard, which is a standard for evaluating memory device endurance and retention developed by Joint Electron Device Engineering Council (JEDEC). The SSD firmware may restore the mapping table by reading these updated segments from the NAND flash and then patching the newly updates. Segments of hot data would flush to the NAND flash more frequently than segments of cold data. For example, hot segments, such as Seg 0 and Seg 1, can be flushed more frequently than cold segments, such as Seg 18 and Seg 19. Cold segments may be infrequently written by the SSD firmware.

Figure 3:
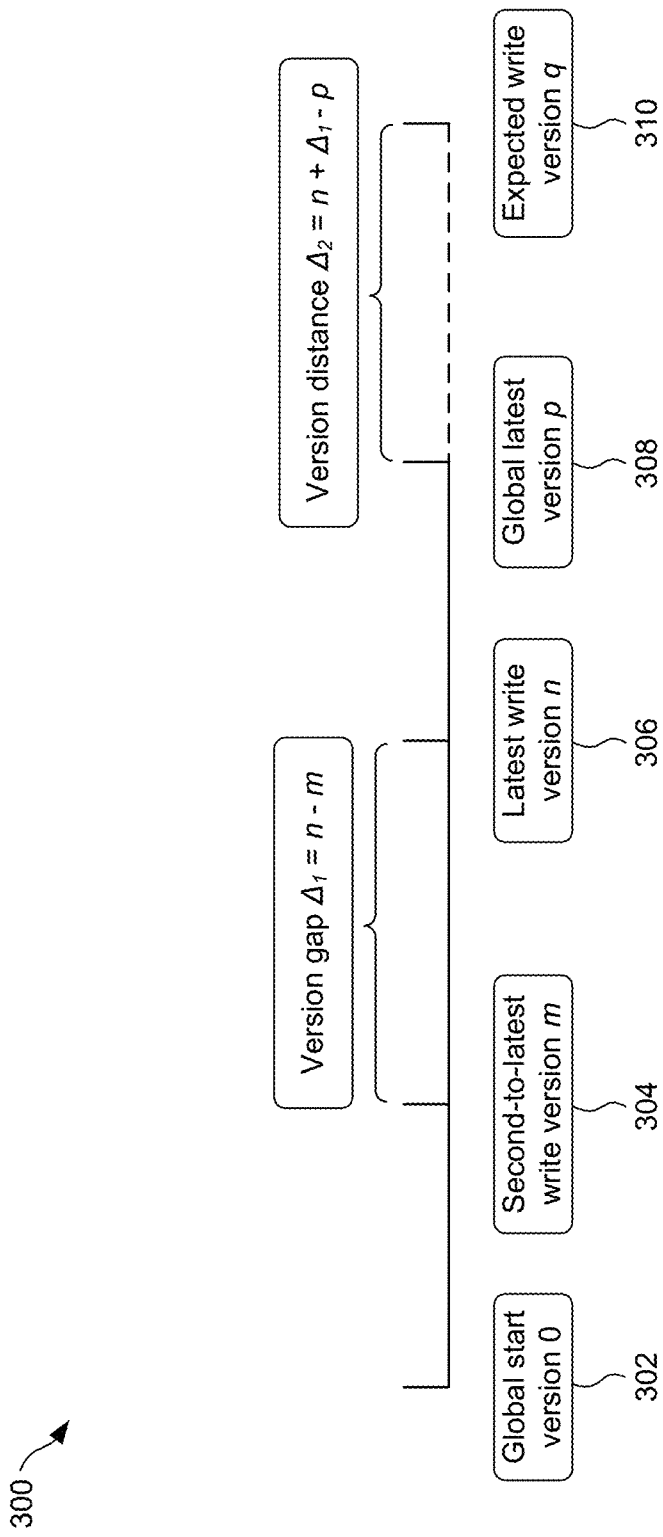
FIG. 3 is an exemplary diagram for assigning dynamic attributes to address units (AUs), in accordance with some embodiments.

FIG. 3 illustrates an exemplary diagram for assigning dynamic attributes to address units (AUs), according to some embodiments of the present disclosure. The dynamic attributes described in the present disclosure can be a dynamic representation of whether data stored in NAND flash memory devices is considered to be hot data or cold data. In some embodiments, the dynamic attribute is assigned to one or more AUs and can include information related to (i) whether the data stored in the one or more AUs has been accessed by the host controller; and (ii) an estimate of whether the aforementioned data will be accessed by the host controller. An AU can include at least one LBA. In some embodiments, if multiple LBAs are included, the LBAs can be sorted in an ascending or a descending order. In some embodiments, the LBAs can be sorted using any suitable order. Physical addresses of pages in a super block can be allocated to the sorted LBAs in the mapping table until all pages are allocated. In some embodiments, physical addresses of first level pages are allocated followed by the allocation of physical addresses of second level pages.

The dynamic attribute assigned to one or more AUs can be based on version numbers that are representative of the frequency of data access by a memory controller, such as a count value that corresponds to the number of times when a host controller has instructed the data to be written or updated. In some embodiments, other suitable control units, such as a garbage control unit, may also be configured to write or update the data. However, in some embodiments, the garbage control unit is not permitted to update version numbers of the one or more AUs. In some embodiments, the sub-group of AUs can include one or more AUs. An example of a sub-group of AUs can be a data segment (e.g., Seg 0 or Seg 1) described with respect to FIG. 2.

The operation of memory blocks can begin with updating a sub-group of AUs assigned to one or more super blocks. The sub-group of AUs of the group of AUs on which the initial write operation is performed can be assigned an initial version of 0, which can also be referred to as global start version 0. In some embodiments, every time a sub-group of AUs of the group of AUs is written by a memory controller, the version count would increase by a suitable increment, such as 1. The latest global version number can be assigned to the sub-group of AUs that was last updated. The sub-group of AUs would maintain its assigned version number until the sub-group of AUs is updated again.

The aforementioned operations can be illustrated by sequence 300 of FIG. 3 that describes a write sequence performed on a group of AUs for data stored in one or more super blocks.

At step 302, a write sequence is initiated on a first sub-group of AUs of the group of AUs. Therefore, the first sub-group of AUs is assigned a write version number of 0, which can also be referred to as global start version 0.

At step 304, a second sub-group of AUs is updated. In some embodiments, the second sub-group of AUs can be the same sub-group as the first sub-group of AUs. In some embodiments, the first and second sub-groups of AUs can be different sub-groups. A write version number m can be assigned to the second sub-group of AUs when it was updated at step 304 by suitable components of the electronic system 100, such as host controller 104 or flash translation layer 140.

At step 306, the second sub-group of AUs is updated again, and assigned an updated write version number n by suitable components of the electronic system 100, such as host controller 104 or flash translation layer 140. Other sub-groups of AUs of the group of AUs were updated between step 304 and step 306, resulting in a version gap $\Delta_1$ between steps 304 and 306, as shown in FIG. 3. In some embodiments, the version gap $\Delta_1$ can be determined using the equation of $\Delta_1 = n-m$. A greater version gap $\Delta_1$ would indicate a longer interval between updates. Host controller 104 or flash translation layer 140 of the electronic system 100 can be configured to determine the version gap for any sub-group of AUs of the group of AUs. In some embodiments, any suitable component of the electronic system 100 can be configured to determine the version gap.

At step 308, additional sub-groups of AUs are updated. In some embodiments, a suitable controller of the electronic system 100 can be configured to assign a latest version number to the sub-group of AUs that is the latest being updated. For example, write version p can be assigned to the sub-group of AUs that is the latest updated, which can also be referred to as global latest version p. In some embodiments, the sub-group of AUs that is being updated in step 308 can be a different sub-group than second sub-group of AUs that was updated in step 306.

A suitable controller of the electronic system 100, such as host controller 104 or flash translation layer 140 can be configured to assign a dynamic attribute to any sub-groups of AUs, such as the second sub-group of AUs that was updated at step 306. The controller can be configured to scan the group of AUs and identify a global latest version number, such as global latest version p, and determine a dynamic attribute for a sub-group of AUs. In some embodiments, the dynamic attribute can be an expectation for when a sub-group of AUs will be updated again by the controller. For example, the dynamic attribute can be an expected distance between when the second sub-group of AUs will be next updated (e.g., at step 310) and the current global latest version p. Specifically, the dynamic attribute can be a version distance $\Delta_2$ calculated by the equation $\Delta_2 = n + \Delta_1 - p$.

For further illustration, consider the following numerical example. At step 304, a particular sub-group of AUs (e.g., the second sub-group of AUs) has been accessed. A memory controller (e.g., host controller 104 or flash translation layer 140 of the electronic system 100) assigns a write version number of m=100 to the particular sub-group of AUs. At step 306, the particular sub-group of AUs has been accessed again and assigned an updated write version number of n=250. The memory controller of the electronic system 100 can be configured to calculate version gap $\Delta_1$ using the equation version gap $\Delta_1=n-m=250-100=150$. At step 308, additional sub-groups of AUs are updated, and a sub-group of AUs different from the aforementioned specific sub-group of AUs has been assigned a global latest version p=300. The memory controller of the electronic system 100 can be further configured to calculate a version distance/busing the equation $\Delta_2=n+\Delta_1-p=250+150-300=100$.

As the global latest version p increases overtime, the value of the assigned dynamic attribute such as version distance $\Delta_2$ decreases correspondingly, which is an indication that the specific sub-group of AUs with the assigned dynamic attribute becomes "hotter" and will be more likely to be updated. Therefore, the dynamic attribute assigned to a group or sub-group of AUs can be relied upon to determine an activeness status of the group or sub-group of AUs. In some embodiments, the activeness status can represent both the update frequency of a piece of data and the probability of the data being updated in the future. A controller (e.g., host controller 104 or flash translation layer 140) of the electronic system 100 can be configured to determine the activeness status. In some embodiments, in response to the dynamic attribute being lower than a threshold value (e.g., version count with a numerical value of 80), the group or sub-group of AUs with the determined dynamic attribute can be assigned a hot data status. In some embodiments, in response to the dynamic attribute being greater than the threshold value, the group or sub-group of AUs with the dynamic attribute can be assigned a cold data status. As the global latest version (e.g., global latest version p) gradually increases, the dynamic attribute (e.g., version distance 42) decreases correspondingly which is an indication that the data of the dynamic attribute becomes more likely to be updated. In other words, the data becomes hotter. In some embodiments, host controller 104 or flash translation layer 140 can be configured to identify super blocks with higher counts (e.g., read, write, and/or erase counts), and move data of the group or sub-group of AUs with a cold data status into the identified super blocks with higher counts. In some embodiments, host controller 104 and flash translation layer 140 can be configured to identify super blocks with lower counts (e.g., read, write, and/or erase counts), and move data of the group or sub-group of AUs with a hot data status into the identified super blocks with lower counts. As hot data is likely to be updated more frequently, efficiently identifying hot and cold data and moving the data respectively to super blocks with lower and higher counts can balance counts across the memory device, which in turn improves wear leveling.

In some embodiments, each of the super blocks corresponds to an erase count. The erase count can be stored in memory of a storage system, such as the local memory 130 and the flash memory array 160 of the storage system 110 shown in FIG. 1. The erase count can also be stored in a corresponding super block. In some embodiment, a flash translation layer, such as the flash translation layer 140 in FIG. 1, can manage the erase count. For example, the erase count is set to 0 prior to a first erase operation on the corresponding super block. The flash translation layer increase the erase count by 1 every time the corresponding super block is erased. In some embodiment, each of the super blocks can also correspond to other counters, such as a read count and a write count, which are similarly stored and similarly managed by the flash translation layer.

In some embodiments, the flash translation layer 140 can identify super blocks with higher counts (e.g., read, write, and/or erase counts) or lowers counts (e.g., read, write, and/or erase counts) based on a predetermined threshold. For example, if a super block has an erase count that is higher than predetermined threshold, the flash translation layer 140 determines that the super block has a higher erase count. Otherwise, the flash translation layer 140 determines that the super block has a lower erase count. In other embodiments, the flash translation layer 140 can identify super blocks with higher counts (e.g., read, write, and/or erase counts) or lowers counts (e.g., read, write, and/or erase counts) based on a predetermined high threshold and a predetermined low threshold. For example, if a super block has an erase count that is higher than predetermined high threshold, the flash translation layer 140 determines that the super block has a higher erase count. If the super block has an erase count that is lower than predetermined low threshold, the flash translation layer 140 determines that the super block has a lower erase count. If the erase count is between the predetermined high threshold and the predetermined low threshold, the erase count is neither a lower erase count nor a higher erase count.

In yet another embodiment, the flash translation layer 140 can identify super blocks with higher counts (e.g., read, write, and/or erase counts) or lowers counts (e.g., read, write, and/or erase counts) based on an average count. For example, the flash translation layer 140 can calculate an average erase count of the storage system 110 based on erase counts of super blocks of the storage system 110. The flash translation layer 140 can add the erase counts of the super blocks and divide the sum by a number of super blocks. If a super block has an erase count that is higher than average erase count, the flash translation layer 140 determines that the super block has a higher erase count. Otherwise, the flash translation layer 140 determines that the super block has a lower erase count.

Rather than a static attribute representing the hotness of data, the dynamic attribute not only takes into account an interval between updates for a specific sub-group of AUs, but also takes into account the writing progress of other AUs of the one or more super blocks. Assigning dynamic attributes to one or more AUs provides the benefit of, among other things, a more accurate representation of the "hotness" of data, which in turn improves wear leveling and lifetime of the non-volatile memory devices. In some embodiments, only host controller 104 or flash translation layer 140 are permitted to update version numbers. In some embodiments, other components of the electronic system 100, such as a garbage control unit, are not permitted to update the version numbers.

The dynamic attributes can be assigned to multiple AUs, according to some embodiments of the present disclosure. Grouping multiple AUs and assigning a dynamic attribute to the group provides various benefits, such as more efficient storage of version information. For example, grouping multiple (e.g., 1024) units of AUs and assigning a single dynamic attribute to the group can save significant storage space compared to assigning a dynamic attribute to every AU of the aforementioned group. When one AU of the group is accessed, the dynamic attribute of the group will be updated.

Figure 4:
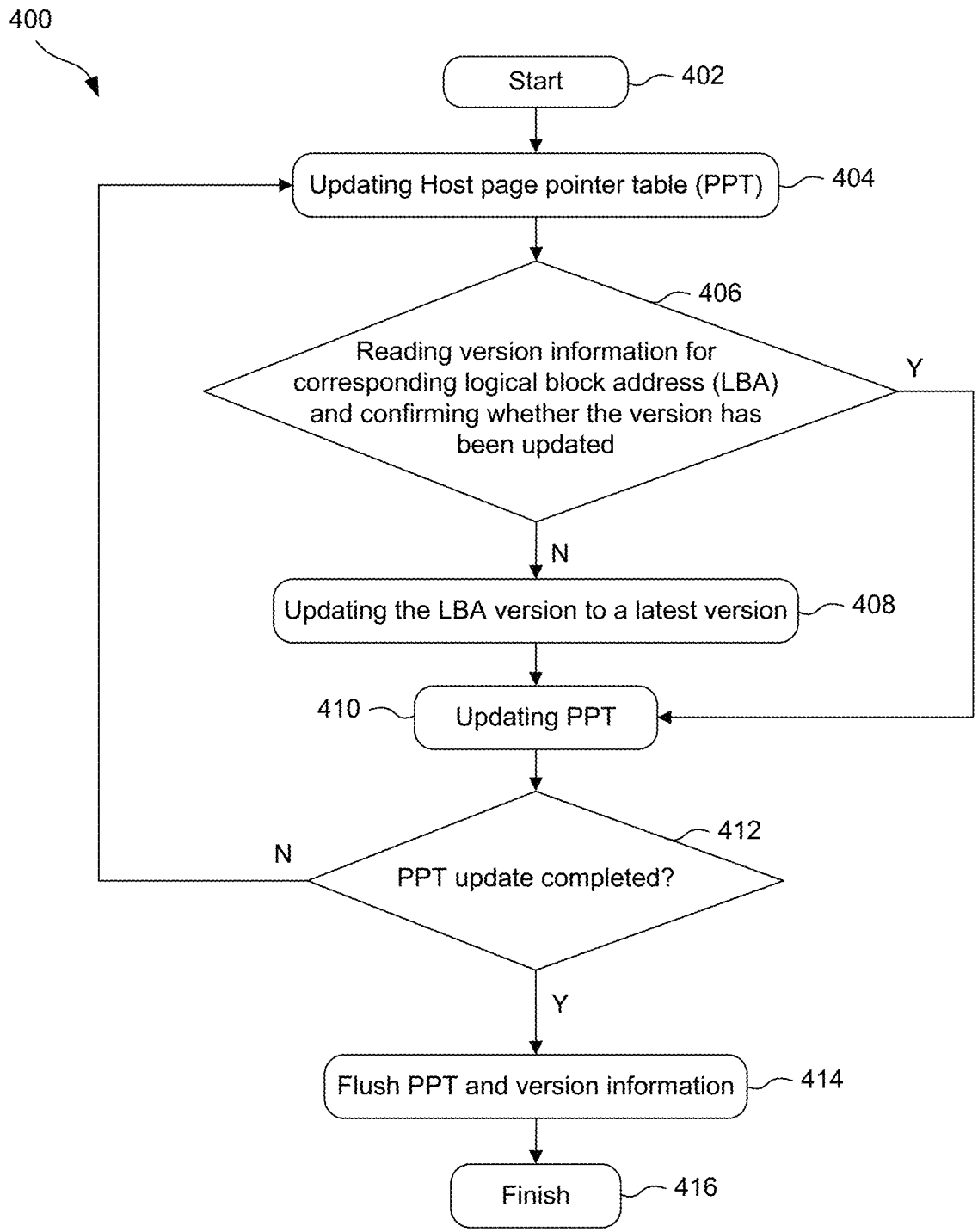
FIG. 4 is a flow diagram of an exemplary method for flushing and updating a page pointer table (PPT), in accordance with some embodiments.

FIG. 4 is a flow diagram of an exemplary method 400 for flushing and updating a page pointer table (PPT), in accordance with some embodiments of the present disclosure. The operations of method 400 can be performed in a different order and/or vary, and method 400 can include more operations that are not described for simplicity. Any reasonable application of method 400 in memory block management is within the scope of this disclosure.

Operation 402 includes starting the method 400, according to some embodiments.

Operation 404 includes updating a page pointer table (PPT) of the host, according to some embodiments. In some embodiments, a PPT table can be used to translate a logical address to a physical address of a memory device. The PPT table can include translation indexes for maintaining logical to physical conversion.

Operation 406 includes reading version information for corresponding logical block address (LBA) and confirming whether version numbers have been updated, according to some embodiments. If the version has not been updated, proceed to operation 408. If the version numbers have already been updated, proceed to operation 410. In some embodiments, a host controller (e.g., host controller 104 of FIG. 1) or flash translation layer (e.g., flash translation layer 140) can be configured to process data in the logical domain using LBA information. In some embodiments, each AU can have one corresponding LBA. In some embodiments, multiple AUs can be grouped to form a group of AUs.

Operation 408 includes updating the LBA version number to a latest version, according to some embodiments. In some embodiments, the LBA version can be updated by the host controller (e.g., host controller 104) or the flash translation layer (e.g., flash translation layer 140). For example, host controller 104 or flash translation layer 140 can be configured to update the hot/cold status of the data according to sequence 300 described in FIG. 3.

Operation 410 includes updating the PPT, according to some embodiments. In some embodiments, host controller 104 or flash translation layer 140 can be configured to scan the memory device and determine wear level of the memory device. For example, host controller or flash translation layer 140 can be configured to identify super blocks with higher and lower counts (e.g., read, write, and/or erase counts), and further configured to move data of the group or sub-group of AUs with a cold data status into the identified super blocks with higher counts. In some embodiments, host controller 104 and flash translation layer 140 can be further configured to identify super blocks with lower counts (e.g., read, write, and/or erase counts), and move data of the group or sub-group of AUs with a hot data status into the identified super blocks with lower counts. As hot data is likely to be updated more frequently and cold data is likely to be updated less frequently, efficiently identifying hot and cold data and moving the data respectively to super blocks with lower and higher counts can balance counts across the memory device, which in turn improves wear leveling.

Operation 412 includes confirming whether PPT has been updated, according to some embodiments. If the PPT has been updated, operation 410 proceeds to operation 414. If the PPT has not been updated, operation 410 proceeds to operation 404, which updates the host PPT.

Operation 414 includes flushing PPT and version information, according to some embodiments. In some embodiments, whether to perform the flushing action can be based on the activeness status for one or more groups or sub-groups of AUs.

Operation 416 includes finishing method 400.

Various embodiments in the present disclosure describe methods for controlling writing and erasing memory blocks by dynamically labelling and arranging data stored the memory blocks, according to some embodiments of the present disclosure. In some embodiments, data stored in super blocks can be assigned one or more dynamic attributes (e.g., version numbers) that is determined based on at least a latest global latest write version number and a history write version gap. In some embodiments, multiple AUs can be grouped together and assigned a single dynamic attribute. The history write version gap can be a gap between the current version number of the effective AU and a previous version number of the AU when it was last updated. The assigned dynamic attribute not only takes into account an interval between updates for a specific sub-group of AUs, but also takes into account the writing progress of other AUs of the one or more super blocks. As the writing progress of other AUs proceed, the dynamic attribute of the group of AUs may change accordingly. Assigning dynamic attributes to one or more AUs provides the benefit of, among other things, a more accurate representation of the "hotness" of data, which in turn improves wear leveling and lifetime of the non-volatile memory devices.

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of controlling memory blocks, comprising:
   determining a first write version number of a first group of address units (AUs) of a plurality of AUs at a first time, wherein each AU of the first group of AUs includes at least one logical block address (LBA) of a plurality of memory blocks;
   determining a second write version number of the first group of AUs at a second time, the first time before the second time, the first write version number and the second write version number correspond to count values representative of a number of times data has been updated in the first group of AUs, and the second write version number is greater than the first write version number;
   calculating a history write version gap by subtracting the first write version number from the second write version number;
   determining a third write version number of a second group of AUs of the plurality of AUs, the second group of AUs corresponding to a group of AUs last updated after the first among all groups of AUs, wherein the third write version number corresponds to a count value representative of a number of times data has been updated in the second group of AUs;
   determining a dynamic attribute of the first group of AUs and the second group of AUs, wherein the dynamic attribute is a value representing hotness of data of the first group of AUs based on the number of times the data has been updated in the first group of AUs and the second group of AUs, and wherein the dynamic attribute is calculated by:
      adding the second write version number of the first group of AUs to the history write version gap to calculate a sum; and
      subtracting the third write version number of the second group of AUs from the sum;
   determining an activeness status of the first group of AUs based on the dynamic attribute; and moving the data stored in the first group of AUs into the second group of AUs based on the activeness status of the first group of AUs, the second write version number, and the third write version number.

2. The method of claim 1, further including:
determining a first data unit has a higher erase count than a predetermined erase count threshold; and
moving the data stored in the first group of AUs based on the higher erase count of the first data unit.

3. The method of claim 2, wherein determining the erase count of the first data unit further includes determining that the erase count of the first data unit is higher than an average erase count.

4. The method of claim 1, wherein determining the third write version number of the second group of AUs further includes determining a latest global version of the plurality of memory blocks.

5. The method of claim 1, wherein calculating the history write version gap further includes determining a number of times a host controller has accessed the plurality of AUs between the first and second write version numbers.

6. The method of claim 1, wherein determining the dynamic attribute is in response to a determination that the first group of AUs requires an update.

7. The method of claim 1, wherein determining the activeness status further includes:
in response to the dynamic attribute being less than a threshold value, assigning a hot data status to the first group of AUs; and
in response to the dynamic attribute being greater than the threshold value, assigning a cold data status to the first group of AUs.

8. The method of claim 7, further including:
in response to the cold data status being assigned to the first group of AUs, moving the data stored in the first group of AUs to the second group of AUs; and
in response to the hot data status being assigned to the first group of AUs, moving the data stored in the first group of AUs to a third group of AUs.

9. An electronic system, comprising:
a storage medium including a plurality of flash memory arrays, wherein each flash memory array of the plurality of flash memory arrays includes a plurality of data units;
a host computer; and
a host controller configured to:
determine a first write version number of a first group of address units (AUs) of a plurality of AUs at a first time, wherein each AU of the first group of AUs includes at least one logical block address (LBA) of a plurality of memory blocks;
determine a second write version number of the first group of AUs at a second time, the first time before the second time, the first write version number and the second write version number correspond to count values representative of a number of times data has been updated in the first group of AUs, and the second write version number is greater than the first write version number;
calculate a history write version gap by subtracting the first write version number from the second write version number;
determine a third write version number of a second group of AUs of the plurality of AUs, the second group corresponding to a group of AUs last updated among all groups of AUs, wherein the third write version number corresponds to a count value representative of a number of times data has been updated in the second group of AUs;
determine a dynamic attribute of the first group of AUs and the second group of AUs, wherein the dynamic attribute is a value representing hotness of data of the first group of AUs based on the number of times the data has been updated in the first group of AUs and the second group of AUs, and wherein to calculate the dynamic attribute the host controller is configured to:
add the second write version number of the first group of AUs to the history write version gap to calculate a sum; and
subtract the third write version number of the second group of AUs from the sum;
determine an activeness status of the first group of AUs based on the dynamic attribute; and
move the data stored in the first group of AUs into the second group of AUs based on the activeness status of the first group of AUs, the second write version number, and the third write version number.

10. The electronic system of claim 9, wherein the host controller is further configured to:
determine an erase count of a first data unit is higher than a predetermined erase count threshold; and
move the data stored in the first group of AUs based on the erase count of the first data unit.

11. The electronic system of claim 10, wherein to determine the erase count of the first data unit, the host controller is further configured to determine that the erase count of the first data unit is higher than an average erase count.

12. The electronic system of claim 9, wherein to determine the third write version number of the second group of AUs, the host controller is further configured to determine a latest global version of the plurality of memory blocks.

13. The electronic system of claim 9, wherein to calculate the history write version gap, the host controller is further configured to determine a number of times the host controller has accessed the plurality of AUs between the first and second write version numbers.

14. The electronic system of claim 9, wherein the host controller is further configured to determine the dynamic attribute in response to a determination that the first group of AUs requires an update.

15. A non-transitory computer-readable medium containing computer-executable program for, when being executed by a processor, implementing a method for controlling memory blocks, the method comprising:
determining a first write version number of a first group of address units (AUs) of a plurality of AUs at a first time, wherein each AU of the first group of AUs includes at least one logical block address (LBA) of a plurality of memory blocks;
determining a second write version number of the first group of AUs at a second time, the first time before the second time, the first write version number and the second write version number correspond to count values representative of a number of times data has been updated in the first group of AUs, and the second write version number is greater than the first write version number;
calculating a history write version gap by subtracting the first write version number from the second write version number;
determining a third write version number of a second group of AUs of the plurality of AUs, the second group of AUs corresponding to a group of AUs last updated among all groups of AUs, wherein the third write version number corresponds to a count value representative of a number of times data has been updated in the second group of AUs;

determining a dynamic attribute of the first group of AUs and the second group of AUs, wherein the dynamic attribute is a value representing hotness of data of the first group of AUs based on the number of times the data has been updated in the first group of AUs and the second group of AUs, and wherein the dynamic attribute is calculated by:

adding the second write version number of the first group of AUs to the history write version gap to calculate a sum; and subtracting the third write version number of the second group of AUs from the sum;

determining an activeness status of the first group of AUs based on the dynamic attribute; and moving the data stored in the first group of AUs into the second group of AUs based on the activeness status of the first group of AUs, the second write version number, and the third write version number.

16. The non-transitory computer-readable medium of claim 15, further including:

determining a first data unit has a higher erase count than a predetermined erase count threshold; and moving the data stored in the first group of AUs based on the higher erase count of the first data unit.

17. The non-transitory computer-readable medium of claim 16, wherein determining the first data unit has the higher erase count further includes determining that the higher erase count of the first data unit is higher than an average erase count.

18. The non-transitory computer-readable medium of claim 15, wherein determining the third write version number of the second group of AUs further includes determining a latest global version of the plurality of memory blocks.

19. The non-transitory computer-readable medium of claim 15, wherein calculating the history write version gap further includes determining a number of times the host controller processor has accessed the plurality of AUs between the first and second write version numbers.

* * * * *